(12) United States Patent
Roberts et al.

(10) Patent No.: US 6,863,215 B2
(45) Date of Patent: Mar. 8, 2005

(54) ACCESS SYSTEM AND METHOD FOR BUSES

(75) Inventors: Allan Roberts, Lockport, IL (US); Thomas Mavec, Joliet, IL (US)

(73) Assignee: Robotics Technologies, Inc., Joliet, IL (US)

(*) Notice: Subject to any disclaimer, the term of this patent is extended or adjusted under 35 U.S.C. 154(b) by 0 days.

(21) Appl. No.: 10/452,342

(22) Filed: Jun. 2, 2003

(65) Prior Publication Data
US 2004/0016800 A1 Jan. 29, 2004

Related U.S. Application Data

(63) Continuation of application No. 09/873,029, filed on Jun. 1, 2001, now Pat. No. 6,631,841.

(51) Int. Cl.[7] .................................................. G06K 5/00
(52) U.S. Cl. .................................... 235/382; 235/382.5
(58) Field of Search ............................. 235/382, 440, 235/382.5; 705/72, 5, 6, 13

(56) References Cited

U.S. PATENT DOCUMENTS

| 3,590,333 A | | 6/1971 | Blum |
| 3,622,991 A | | 11/1971 | Lehrer |
| 3,926,021 A | | 12/1975 | Genest et al. |
| 3,956,753 A | * | 5/1976 | Armstrong et al. ........... 346/34 |
| 4,079,605 A | * | 3/1978 | Bartels ........................ 70/277 |
| 4,213,118 A | | 7/1980 | Genest et al. |
| 5,055,658 A | | 10/1991 | Cockburn |

* cited by examiner

Primary Examiner—Michael G. Lee
Assistant Examiner—Kimberly D. Nguyen
(74) Attorney, Agent, or Firm—Schiff Hardin LLP

(57) ABSTRACT

In an access system and method for buses, a master card and respective slave cards for respective students are provided. The cards are read by a card reader to control access to the bus. A microprocessor and memory are provided together with an annunciator which determine whether a slave card annunciator code corresponds to an annunciator code on the master card, thus determining whether a respective student is boarding a bus which corresponds with his respective route.

10 Claims, 1 Drawing Sheet

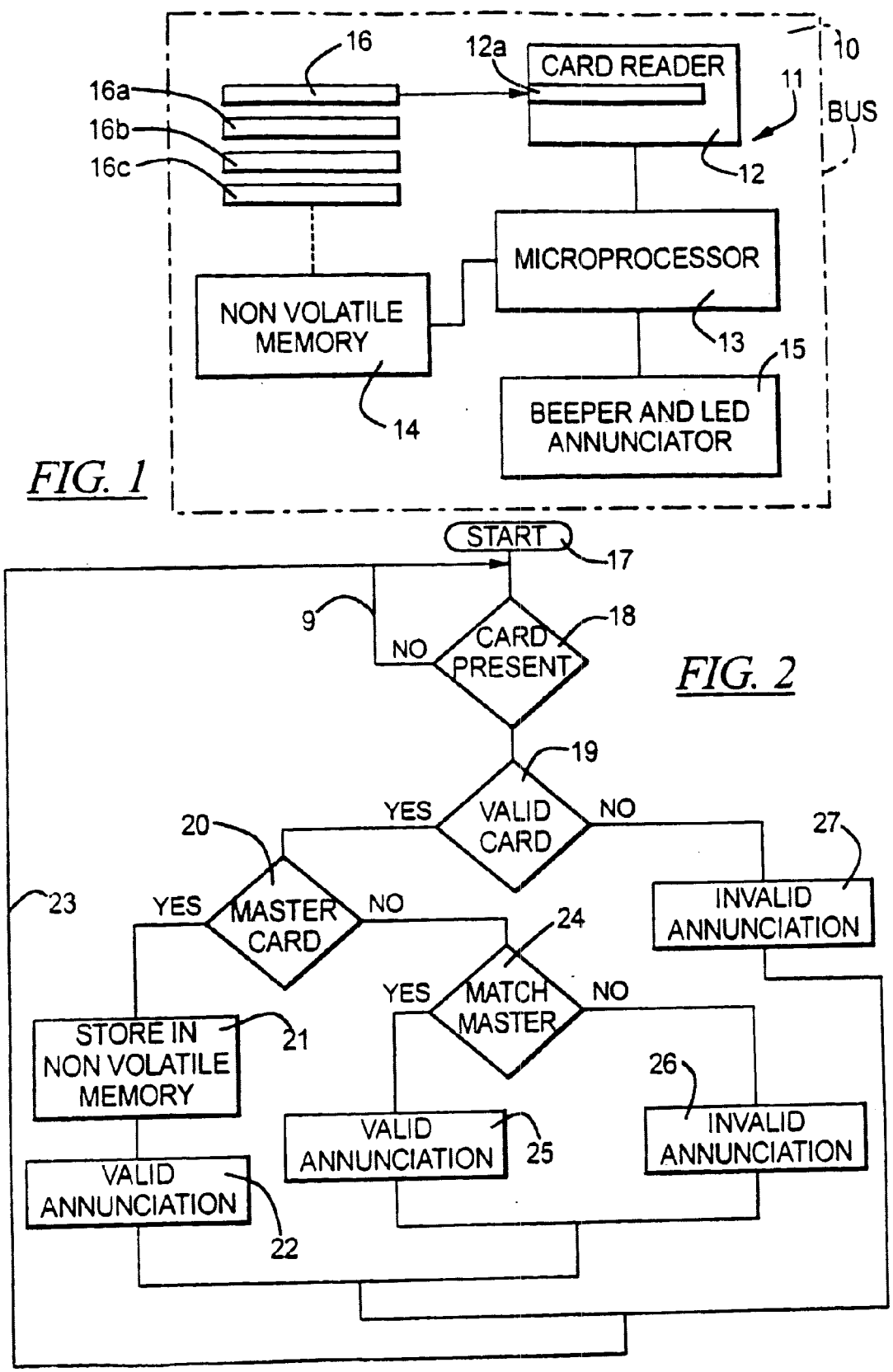

ACCESS SYSTEM AND METHOD FOR BUSES

CROSS-REFERENCE TO RELATED APPLICATION

This application is continuation of application Ser. No. 09/873,029, filed Jun. 1, 2001 now U.S. Pat. No. 6,631,841.

BACKGROUND OF THE INVENTION

Important administrative and safety considerations in the transportation of students on school buses are the assignment and tracking of students to specific, designated buses. From an economic perspective, many companies who contract transportation services to school districts are paid according to the number of students who actively ride their buses. As a matter of safety, it is imperative to ensure that students are boarding their assigned routes.

SUMMARY OF THE INVENTION

It is an object of the invention to provide a system and method which will ensure that students, when boarding school buses, are on the right school bus for the respective assigned routes.

According to the present invention, a method and apparatus are provided employing a master card and a slave card for respective students. A master card is assigned which uniquely corresponds to a given bus with an assigned route. A code identifier is encoded on the master card which is used as a reference for all succeeding slave cards as a means of validating whether students are on the correct bus. Each time a new master card is swiped by a card reader, a memory of the system is updated with the new master code. Thereafter, succeeding slave cards which are read by the card reader must match the master card code to receive a valid annunciation.

BRIEF DESCRIPTION OF THE DRAWINGS

FIG. 1 is a block diagram showing the access system for buses according to the present invention; and FIG. 2 is a flow chart showing the method steps performed by software in conjunction with a microprocessor in the system and method of the present invention.

DESCRIPTION OF THE PREFERRED EMBODIMENT

For the purposes of promoting an understanding of the principles of the invention, reference will now be made to the preferred embodiment illustrated in the drawings and specific language will be used to describe the same. It will nevertheless be understood that no limitation of the scope of the invention is thereby intended; and alterations and further modifications in the illustrated device and method, and further applications of the principles of the invention as illustrated therein are contemplated as would normally occur to one skilled in the art to which the invention relates.

As shown in FIG. 1, the access system and method for buses 10 containing the system generally shown at 11 employs a magnetic card reader 12 to control access to the bus 10. A master card 16 is assigned an identifying code uniquely corresponding to a given bus number or route. The identifying code containing numbers, letters and/or other types of indicia is encoded on the master card and is used as a reference code for all succeeding slave cards 16a–16c as a means of validating students being on the correct bus. The master card 16 identifying code is identical to an identifying code on the slave cards 16a–16c, but has an extra digit or letter, for example, that designates it as a master card. Each time a new master card 16 is swiped in the card reader 12, a system non-volatile memory 14 is updated for the new "master" identifying code. A master card is under control of a transportation administrator or bus driver.

Thereafter, the codes on all succeeding slave cards 16a–16c (student cards) swiped must match the master code to receive a "valid" annunciation. Annunciations, valid or invalid, may comprise a beeper and/or an LED annunciator 15 that is specific to an identifiable valid or invalid state.

Thus, the system which operates according to the method of the invention as shown in FIG. 1 comprises the card reader 12, the microprocessor 13, the non-volatile memory 14, and the annunciator 15. When a master or slave card is swiped in a slot 12a in the card reader, its encoded identifier code is decoded by the attached microprocessor 13. If the swiped card is a master card 16, then the encoded identifier code of the card is stored in the non-volatile memory 14 as a reference code for succeeding card swipes. If the swiped card is a slave card 16a–16c, then the encoded identifier code is compared against the previously stored master identifier code in memory for a match. If the slave identifier code matches the master identifier code, then the "valid" annunciation indicator is activated. Otherwise, the "invalid" annunciation is activated.

A software flowchart showing method steps of the invention is illustrated in FIG. 2. Beginning at start block 17, the program loops through the "card present" block at 18 through loop 9 until the card is detected as present. If a bad read has occurred in "valid card" block 19, then the program annunciates an "invalid" state via the invalid annunciation block 27 and returns to loop for card presence through the feedback loop path 23.

Upon detection of a valid card presence at the "valid card" block 19, the decoded card identifier code is examined at "master card" block 20 to determine if it is a master card. If it is, then the immediate card identifier number is stored as the new master (reference) identifier code—see the "store in non-volatile memory" block 21 and the "valid annunciation" block 22. The program then loops through feedback loop path 23 to await the next card swipe.

If the valid card is not a master card, then it is a slave card. Its identifier code is compared with the stored master reference identifier code in the "match master" block 24. If the card identifier codes do not match, then an "invalid" annunciation is invoked via block 26, and the program returns to loop through feedback loop path 23 to loop for card presence. If the card identifier codes match, then a "valid" annunciation is invoked via "valid annunciation" block 25 and the program loops through feedback loop path 23 to await the next card swipe.

The present invention provides a simple, easily-installed and very cost-effective device that provides a tool for controlling and administrating student transportation.

Although in the preferred embodiment the card reader is shown as a magnetic card reader, other types of card readers may be employed such as optical or any other type appropriate for reading master and slave cards having magnetic, optical, bar code or any types of indicia.

Although the annunciator is preferably comprised of a beeper and an LED for audio and visual indications, any other type of annunciation may be provided including other types of lights and other types of sound producers.

Although a non-volatile memory 14 is provided, other types of memories may be employed with the microproces-

We claim as our invention:

1. A bus access system for tracking of students to ensure that they board a correct bus for a correct assigned route, comprising:

a card reader on said bus with a processor connected to the card reader, and a memory and an annunciator connected to the processor;

a master card having an identifier code corresponding to said assigned route, a respective slave card for respective students for the assigned route, the slave card also having an identifier code thereon which matches the master card identifier code, and wherein at least one of said master card and said slave cards has an indicator permitting identification of the master card and distinguishing it from the slave cards; and the processor containing a logic which performs the functions of:

upon insertion of the master card, first identifying presence or non-presence of the indicator to verify that a master card has been inserted, and if so, storing said master card identifier code in said memory, and if a slave card is inserted into said card reader, checking to see whether or not said indicator is present to determine whether or not the inserted card is a slave card, and if the inserted card is a slave card-reading the identifier code from the slave card and checking the slave card identifier code against the stored identifier code, and if the stored identifier code and the slave card identifier code are the same providing a valid annunciation by the annunciator, and if the identifier codes do not match, providing an invalid annunciation indicating that the student is on the wrong bus.

2. The apparatus according to claim 1 wherein the processor logic first checks as to whether the inserted slave card or master card is a valid card, and if it is then conducting said check to determine whether or not said indicator is present.

3. The apparatus according to claim 1 wherein the memory comprises a non-volatile memory.

4. The apparatus according to claim 1 wherein the annunciator comprises a visual annunciator.

5. The apparatus according to claim 1 wherein the annunciator comprises an audible annunciator.

6. The apparatus according to claim 1 wherein the identifier code for the master card comprises a plurality of digits having a base code and an extra digit as said indicator that designates it as a master card.

7. The apparatus according to claim 1 wherein the card reader comprises a magnetic card reader.

8. The apparatus according to claim 1 wherein the processor logic, after the identification of the master card and storing of the identifier code, causes the annunciator to provide a valid annunciation.

9. The apparatus of claim 1 wherein the master card has an indicator distinguishing from the slave cards.

10. A bus access system for tracking of students to ensure that they board a correct bus for a correct assigned route, comprising:

a card reader on said bus along with logic equipment having a memory and an annunciator;

a master card having an identifier code corresponding to said assigned route, a respective slave card for the respective students for the assigned route, the slave card also having an identifier code thereon which matches the master card identifier code, and wherein said master card has an indicator to distinguish the master card from the slave cards; and the logic equipment performing the following functions:

upon insertion of the master card, first checking for the indicator to verify that the master card has been inserted, and if so, storing said master card identifier code in said memory, and if one of the slave cards is inserted into said card reader, checking for said indicator to determine if the inserted card is a slave card, and if so, reading the identifier code from the slave card and checking the slave and identifier code against the stored identifier code, and if the stored identifier code and the slave card identifier code are the same, then providing an annunciation indicating that the student is on the correct bus.

* * * * *